United States Patent [19]

Smirl

[11] 3,747,731

[45] July 24, 1973

[54] CONSTANT SPEED CENTRIFUGAL CLUTCH

[75] Inventor: Richard L. Smirl, Arlington Heights, Ill.

[73] Assignee: Borg-Warner Corporation, Chicago, Ill.

[22] Filed: Jan. 26, 1972

[21] Appl. No.: 220,978

[52] U.S. Cl.......... 192/104 R, 192/109 A, 192/30 V
[51] Int. Cl. ............................................ F16d 23/10
[58] Field of Search ..................... 192/104 R, 103 A, 192/105 C, 109 A

[56] References Cited
UNITED STATES PATENTS

| | | | |
|---|---|---|---|
| 1,282,522 | 10/1918 | Ayres | 192/104 R |
| 2,033,835 | 3/1936 | Lansing | 192/104 R |
| 3,268,046 | 8/1966 | Hirano | 192/103 A |
| 3,323,624 | 6/1967 | Maurice | 192/109 A |
| 3,091,314 | 5/1963 | Baynes | 192/104 R |
| 2,302,125 | 11/1942 | Howell | 192/104 R |
| 2,432,591 | 12/1947 | Schuckers | 192/104 R |
| 2,879,871 | 3/1959 | Ranst | 192/104 R |

*Primary Examiner*—Benjamin W. Wyche
*Attorney*—Donald W. Banner et al.

[57] ABSTRACT

A drive system for the transmission of torque from the output of a prime mover such as an internal combustion engine to accessories associated therewith, but which limits the speed of the accessories to a substantially constant, pre-determined maximum regardless of the speed of the input. The drive system includes a friction clutch comprising a driving member and a driven member which are biased to an engaged condition by a diaphragm spring carried by the driven member. Weights attached to the spring are actuable by centrifugal force to exert a force on the spring opposing and decreasing the engaging force as output speed increases to effect a controlled slippage of the clutch.

5 Claims, 4 Drawing Figures

Patented July 24, 1973
3,747,731
2 Sheets-Sheet 1
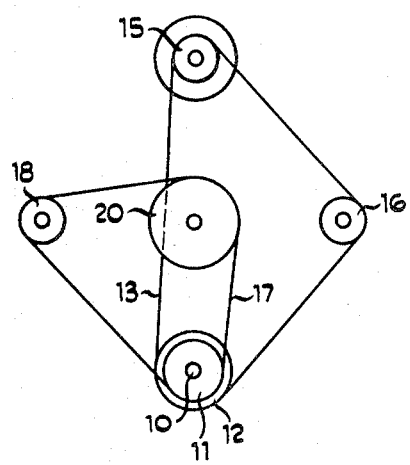
Fig 1
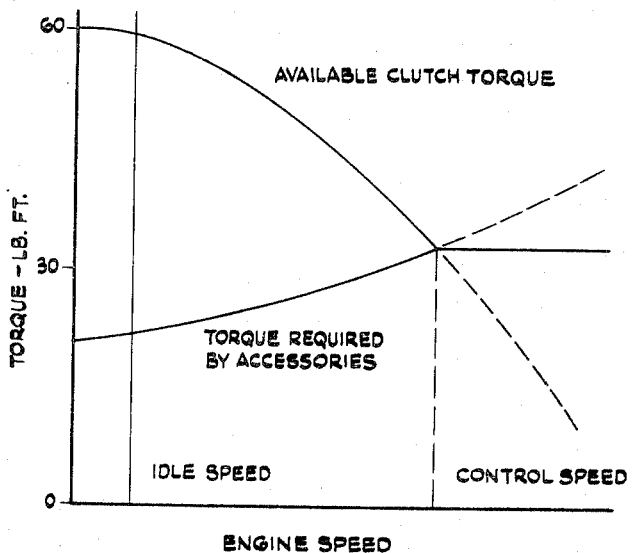
Fig 4
Fig 3
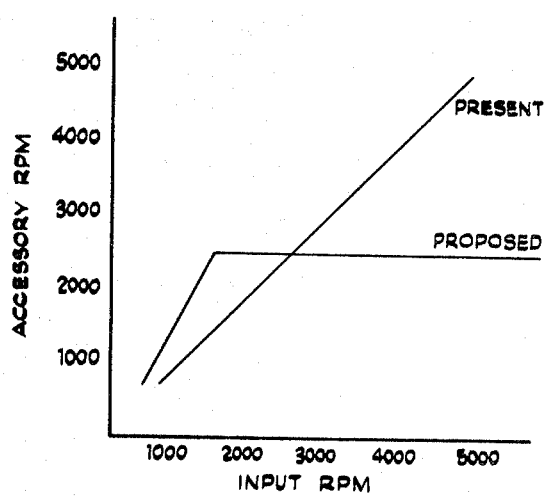

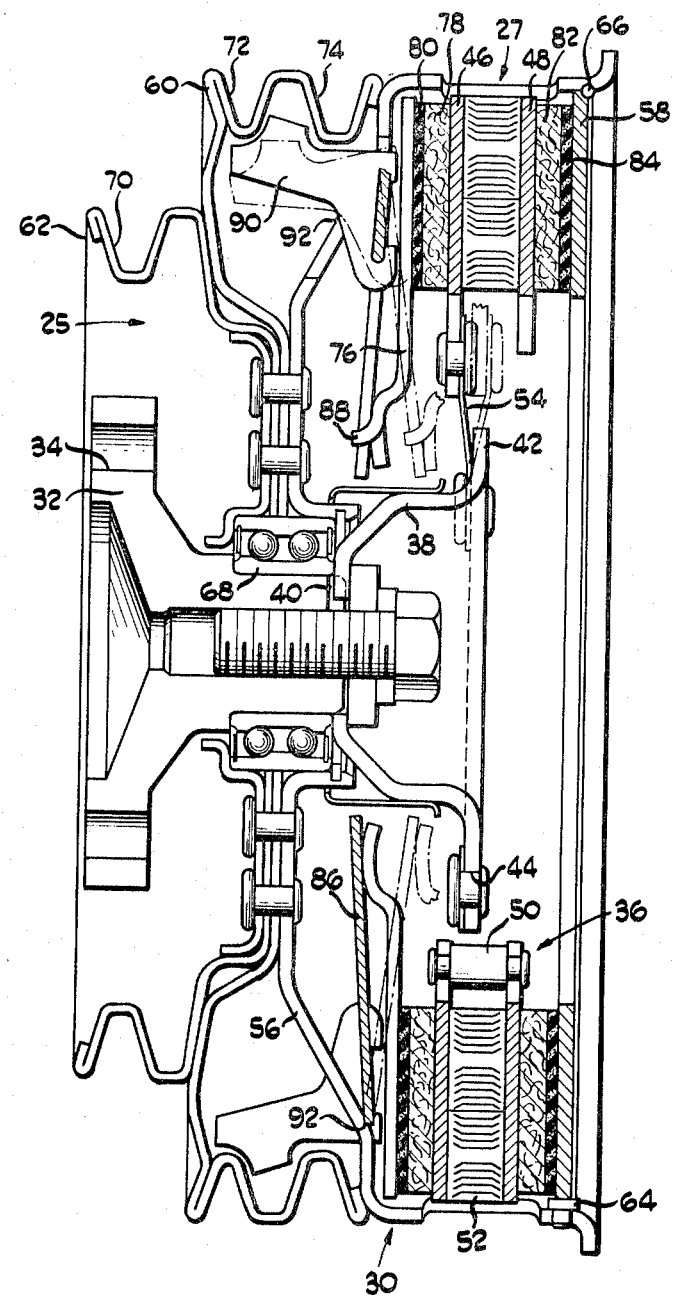

CONSTANT SPEED CENTRIFUGAL CLUTCH

BACKGROUND OF THE INVENTION

This invention relates to clutches for drive systems and more particularly to clutches for accessory drive systems for internal combustion engines. Vehicle engines, particularly, have been called upon to drive an increasing number of accessories as the sophistication of modern day vehicles increases. Consumer acceptance of convenience options and the increase of vehicle weights have demanded increased performance of a number of the belt driven accessories, particularly at low engine speeds.

This need could be satisfied by designing new accessories with increased low speed output or by the development of a completely new accessory system. Alternatively, present production accessories could provide the performance required to meet future demands if they could operate at more effective speeds. Operating speeds should be increased at low engine speeds but not allowed to reach such high speeds where their life is compromised.

One past approach has been to develop dual speed accesspry drives providing one ratio between engine and accessories at low speed and a changeover at a given higher speed to a lower ratio. This has not proven acceptable because of inherent performance deficiencies and a cost penalty which is not balanced by real system needs.

Certain drive systems known in the art have utilized centrifugal weights to effect clutch release but such systems generally require movement of the weights through a certain arc or path to effect release. Such movement must be provided for and results in a structure requiring additional space to accommodate both this travel and the additional weight travel required if clutch facing wear is to be compensated for. The present invention provides a system in which movement of the weights to effect clutch slippage is substantially eliminated. The only weight travel which takes place is to allow and compensate for pad wear. Such a result is accomplished while utilizing a single biasing member as opposed to multiple spring systems shown in the prior art.

The present invention attempts to overcome the deficiencies of prior art accessory drive systems by providing a speed limiting accessory drive which permits an increase in drive ratios at low speeds and limits the output speed of the accessories.

SUMMARY OF THE INVENTION

The present invention relates to an accessory drive system for an internal combustion engine which incorporates a speed sensitive clutch. This accessory drive system is based on the principle of limiting accessory speed to a constant pre-selected maximum as the engine continues to increase in R.P.M. over the preselected point. This permits a marked increase in accessory drive speeds at lower engine speeds.

The clutch consists of a driving member adapted to be connected to an output of an internal combustion engine and a driven member adapted to be connected to a plurality of accessories by any of a number of common methods, such as, for example, belts and pulleys. The driven member includes a pair of spring loaded friction pad assemblies biased into engagement with the driving member by a cone-shaped spring. A plurality of weights are attached to the spring in such a manner that they are actuable by centrifugal force to exert a force acting to oppose and decrease the engaging force of the spring which opposing force increases with the speed of the driven member. The clutch will thus allow a controlled rate of slip between the driving and driven members such that the driven member will attain a pre-determined maximum speed which will remain substantially constant as the speed of the driving member continues to increase.

BRIEF DESCRIPTION OF THE DRAWINGS

FIG. 1 is a front view of an accessory drive system.

FIG. 2 is a side view in section of the details of the clutch of the present invention.

FIG. 3 is a graph showing accessory speed versus engine speed.

FIG. 4 is a graph showing operating characteristics of the present invention.

DESCRIPTION OF THE PREFERRED EMBODIMENT

There is illustrated in FIG. 1, a standard type of accessory drive arrangement. A crank shaft 10 carries two pulleys 11 and 12. Additional pulleys, not shown, may also be driven. The pulley 12 has a belt 13 passing thereover which belt, in turn, passes over a pulley 15 which drives an alternator and a pulley 16 which drives a power sterring pump. The pulley 11 has a belt 17 passing thereover which is also in operative association with a pulley 18 for operating a compressor of an automotive air conditioner. The belt 17 also drives a pulley 20 operating a water pump and a radiator cooling fan.

Referring now to FIG. 2, one form of clutch incorporating the principles of the present invention is indicated generally by the numeral 25. The clutch includes a driving member generally referred to as 27 and a driven member generally referred to as 30. A mounting flange 32 is shown adapted to be connected to a crank shaft of an internal combustion engine through bolt holes 34. A rotor generally indicated at 36 forms a part of the driving member 27 and is shown including a hub 38 having a radially inner portion 40 connected to the mounting flange 32 and a radially outer portion 42. The radially outer portion 42 is provided with a plurality of apertures 44. The rotor 36 comprises a pair of spaced apart plates 46 and 48. The plates are connected to each other by a plurality of spacers 50 disposed between the plates and connected to each to hold them apart under compressive loads and to transmit torque from one plate to the other. Disposed between the plates and in heat exchange relation thereto is a convoluted fin member 52 which is adapted to promote the flow of air through the center of the rotor thereby providing for air cooling of the rotor and dissipation of heat.

A plurality of straps 54 connect the hub 38 with the plate 46. The straps 54 are generally formed of a relatively thin metal permitting axial deflection. The straps 54 are connected at one end to the radially outer portion 42 of the hub 38 and at their other end to the plate 46 of the rotor 36. The rotor 36 is thus connected for rotation with the mounting flange 32 and together they form the driving member 27.

The driven member 30 is shown consisting of a housing 56, to which is affixed a reaction member 58, and torque transmitting means including a first pulley 60 and a second pulley 62. The reaction member 58 is constrained against relative rotation with respect to the housing 56 by means of a drive pin 64 secured to housing 56 and adapted to engage a keyway in the reaction member 58. An annular wire retaining ring 66 engages half grooves in both the housing 56 and the reaction member 58 to prevent relative axial movement between these components in one direction. The pulleys and housing are interconnected and rotate as a single unit. They are shown journalled for rotation on the mounting flange 32 by a bearing assembly 68. The driving member 27 and the driven member 30 are thus relatively rotatable with respect to each other. The first and second pulleys 60 and 62 define V grooves 70, 72 and 74 respectively which are adapted to carry drive belts to connect the driven member 30 with various accessories. It is understood that the drive from the driven member to the accessories is here illustrated in the form of belts and pulleys but any other acceptable means for transmitting rotary torque, for example, gears, chains and sprockets, etc., could be substituted therefor with the same result.

The driven member of the clutch includes a pressure applying member 76 consisting of a generally plate-like member. The pressure applying member, or pressure plate 76, carries a friction element 78. The friction element 78 is formed of a suitable friction material which remains substantially unaffected by the elements. The friction element 78 is adapted to engage the plate 46 and may either consist of segregated individual pads or an annular ring of friction meterial. Disposed between the pressure plate 76 and the friction element 78 is a layer of cushioning material 80. The cushion material is perferably bonded to the pressure plate. It functions to more uniformly distribute the load between the friction element 78 and the plate 46 and additionally, acts to dampen noise and vibration. The cushioning material 80 can be formed of any of a number of compressible materials. A friction element 82 is shown carried by the reaction member 58 and is adapted to engage the plate 48 of the rotor 36. A layer of cushion material 84 similar to the layer of cushion material 80 is shown disposed between the reaction member 58 and the friction element 82 for the same purpose. The friction element 82 is similarn composition and function to the friction element 78.

Biasing means 86 are illustrated in the form of a diaphragm spring here shown as a Belleville spring. The spring 86 is carried by the housing 56 and is shown disposed between the housing 56 and the pressure plate 76. The spring 86, upon assembly of the drive system, is placed in a compressed state such that it exerts a force against the pressure plate 76 to urge the friction element 78 into frictional engagement with the plate 46, the friction element 82 frictionally engaging the plate 48. Tabs 88 are formed on the pressure plate 76 to engage radial slots in spring member 86.

Centrifugal weights 90 are shown attached to the spring 86. The weights 90 extend laterally from the spring 86 and are acted upon by centrifugal force upon rotation of the housing 56 and correspondingly the spring 86. The weights 90 when acted upon by centrifugal force, will tend to pivot outwardly about a point 92. In actual practice no ubstantial movement or pivoting of the weights 90 occur. However, the centrifugal force acting on the weights produces a moment having a force component which acts to oppose and thereby decrease the engaging force of the spring as the speed of the driven member increases.

The operation of the embodiment shown in FIG. 2 is as follows. Torque is transmitted from an output of an internal combustion engine through the mounting flange 32. The mounting flange 32, via the hub 38 and straps 54 rotates the rotor 36. As previously described, the clutch 25, in its assembled condition, is engaged due to the compression of the spring 86.

The friction element 78, by virtue of its engagement with the plate 46 transmits torque through the cushion material 80 to the pressure plate 76. The tabs 88, which engage radial slots in the spring 86 drive the spring and weight assembly. Heel portions of the weights 90 engage slots in the housing 56 thereby transmitting torque to the housing and to pulleys 60 and 62.

Torque is also transmitted from the rotor 36 to the housing 56 through the friction engagement of element 82 with the plate 48, through cushion 84 to reaction member 58 and through drive pin 64 to housing 56.

As the mounting flange 32 and the rotor 36 are rotated, the housing 56 and pulleys 60 and 62 will also be rotated. The driven member 30 will rotate at the same speed as the driving member 27. It should be noted, at this point, that the pulleys 60 and 62 may each have a larger diameter than corresponding crank shaft pulleys of a standard accessory drive system thereby resulting in a higher accessory speed at idle.

As shown in FIG. 4, the torque required to drive the assembly of accessories, as measured at the driven member, increases as engine speed increases. This torque increase is primarily due to the predominating effect of the fan and the water pump whose torque increase essentially as the square of their speed. On the other hand, the available clutch torque is diminished as the speed of the driven member increases by the centrifugal moment of the weights.

The available clutch torque is diminished as the square of the engine speed to the predetermined control point. The two curves meet at the control point, and from that point, both values remain constant as engine speed increases. The control point can be changed for any given design parameter by varying the weights, the spring force or both.

Consequently, as shown in FIG. 3, the accessory speeds increase with engine speed up to the control point. From that point on, accessory speeds remain constant as engine speed continues to increase. As engine speed decreases, relative slippage between driving and driven members also decreases until, when engine speed is lowered to the control point, driving and driven members again rotate as a unit.

It should be pointed out that by virtue of the construction of the clutch of the present invention eliminating any substantial relative motion of the centrifugal weights as speed varies, the usual problems inherent in prior art devices such as pivot friction, hysteresis and hunting are eliminated. The result is that the control point is essentially the same whether it is approached as speed increases or decreases and regardless of the rate of increase or decrease.

In the clutch as originally assembled prior to operation the diaphragm spring is fully compressed beyond its flat position as shown by the solid lines in FIG. 2. Throughout the life of the clutch the friction elements 78 and 82 will wear gradually resulting in a gradual movement of the weights 90, the diaphragm spring 86, the rotor 36 and straps 54 to the positions indicated by the phantom lines in FIG. 2. This design provides an advantage over prior art structures in that a large range of constant spring load is provided regardless of pad wear throughout the life of the unit.

Thus, it has been shown that the present invention provides a speed limiting accessory drive which operates at a higher speed for given engine speeds in the lower speed range than present accessory drives but at the upper end limits the accessory speed to a contant preselected speed as the engine speed continues to increase over the pre-selected point. Such a result is accomlished by a most econimical structure which has been designed to fit into existing space and requires no additional belts or pulleys. The drive system is simple and reliable in operation, is air cooled to provide maximum heat dissipation and requires no fluids or external controls.

Various of the features of the invention are particularly shown and described, hpwever, it should be obvious to one skilled in the art that various modifications may be made therein without departing from the scope of the invention.

What is claimed is:

1. A speed limiting torque transmitting device including a rotary driving member including a generally disc-shaped rotor adapted to be connected to an output of a prime mover; a driven member journalled for rotation with respect to said driving member including a housing and torque transmitting means connected thereto; pressure applying means associated with said housing; a pair of friction elements associated with said driven member for conjoint rotation therewith, one disposed on each side of said rotor and adapted to engage said rotor therebetween; a diaphragm spring compressed between said housing and said pressure applying means to exert a force on said pressure applying means urging said friction element into engagement with said rotor; a plurality of centrifugal weights affixed to and carried by said spring and laterally extending from said spring in a direction away from said rotor actuable by centrifugal force to produce a moment on said spring having a force component which increases with the rotational speed of said spring and acts to oppose and decrease said engaging force of said spring thereby resulting in a controlled slip between said driving member and said driven member above a predetermined output speed.

2. A speed limiting torque transmitting device as in claim 1 wherein said torque transmitting means comprises at least one V-shaped groove.

3. A speed limiting torque transmitting device as in claim 1 including a layer of cushion material carried by said pressure applying means disposed between said pressure applying means and said friction element associated therewith.

4. A speed limiting torque transmitting device as in claim 1 wherein said torque transmitting means comprises at least one pulley connected to said housing.

5. A speed limiting torque transmitting device as in claim 1 including a reaction member connected to said housing for rotation therewith and one of said friction elements being carried by said reaction member.

* * * * *